(12) United States Patent
Manning et al.

(10) Patent No.: US 8,689,839 B2
(45) Date of Patent: Apr. 8, 2014

(54) APPARATUS FOR RECEIVING INSULATION

(75) Inventors: John Douglas Manning, Auburn, NY (US); Jared Paul Fortna, Ithaca, NY (US); Mitchell Louis Conklin, Moravia, NY (US)

(73) Assignee: Phoenix Geothermal Services, LLC, Auburn, NY (US)

( * ) Notice: Subject to any disclaimer, the term of this patent is extended or adjusted under 35 U.S.C. 154(b) by 370 days.

(21) Appl. No.: 13/087,902

(22) Filed: Apr. 15, 2011

(65) Prior Publication Data

US 2012/0261023 A1 Oct. 18, 2012

(51) Int. Cl.
*F16L 9/22* (2006.01)

(52) U.S. Cl.
USPC ............................ 138/155; 138/177; 285/179

(58) Field of Classification Search
USPC .................................. 138/177, 155; 285/179
See application file for complete search history.

(56) References Cited

U.S. PATENT DOCUMENTS

| | | | | |
|---|---|---|---|---|
| 1,153,159 A | | 9/1915 | Gray at al. | |
| 1,904,675 A | * | 4/1933 | Boyer | 285/390 |
| 1,960,557 A | * | 5/1934 | Snyder | 285/179 |
| 2,624,366 A | * | 1/1953 | Pugh | 138/115 |
| 2,739,829 A | * | 3/1956 | Cundiff et al. | 285/21.2 |
| 2,937,662 A | * | 5/1960 | Green | 285/47 |
| 3,998,579 A | | 12/1976 | Nordstrom | |
| 4,163,042 A | * | 7/1979 | Lynch | 422/179 |
| 4,182,378 A | | 1/1980 | Dieter | |
| 4,221,239 A | | 9/1980 | Reale | |
| 4,804,210 A | * | 2/1989 | Hancock | 285/47 |
| 5,048,572 A | * | 9/1991 | Levine | 138/121 |
| 5,437,311 A | * | 8/1995 | Reynolds | 138/115 |
| 5,540,255 A | * | 7/1996 | Trueb et al. | 137/375 |
| 5,915,412 A | * | 6/1999 | Helmsderfer | 137/375 |
| 6,000,420 A | | 12/1999 | Nicholson et al. | |
| 6,003,559 A | | 12/1999 | Baker | |
| 6,035,900 A | * | 3/2000 | Ellis | 138/174 |
| 6,209,319 B1 | * | 4/2001 | Maeda et al. | 60/323 |
| 6,291,043 B1 | | 9/2001 | Abbott | |
| 6,315,005 B1 | | 11/2001 | Sproule, III | |
| 6,382,260 B1 | | 5/2002 | Sproule, III | |
| 6,547,015 B1 | * | 4/2003 | Nowak et al. | 173/169 |
| 6,739,353 B2 | * | 5/2004 | Lechuga | 137/375 |
| 7,100,633 B2 | * | 9/2006 | Lechuga | 137/375 |
| 7,322,379 B2 | * | 1/2008 | Evans | 138/114 |
| 7,578,315 B2 | | 8/2009 | Wilson | |
| 2001/0050110 A1 | | 12/2001 | Born et al. | |
| 2002/0069925 A1 | | 6/2002 | Sawada | |
| 2002/0108663 A1 | | 8/2002 | Lechuga | |
| 2005/0067019 A1 | | 3/2005 | Trueb et al. | |
| 2009/0301596 A1 | | 12/2009 | van Oosten | |
| 2011/0139290 A1 | * | 6/2011 | Duell | 138/155 |

FOREIGN PATENT DOCUMENTS

| | | |
|---|---|---|
| WO | WO-9009547 A1 | 8/1990 |
| WO | WO-9915326 A1 | 4/1999 |
| WO | WO-02070235 A2 | 9/2002 |
| WO | WO-03069213 A1 | 8/2003 |
| WO | WO-2008053251 A2 | 5/2008 |
| WO | WO-2009083937 A2 | 7/2009 |

\* cited by examiner

*Primary Examiner* — Paul R Durand
*Assistant Examiner* — Donnell Long
(74) *Attorney, Agent, or Firm* — Hiscock & Barclay LLP

(57) ABSTRACT

A conduit for facilitating the installation of insulation is disclosed. In one embodiment, the conduit comprises a body having one or more ribs and a collar having a forward end taper. In another embodiment, two or more pieces of conduit are joined to form a conduit network, with at least one piece of conduit comprising a body having one or more ribs and a collar having a forward end taper.

18 Claims, 4 Drawing Sheets

APPARATUS FOR RECEIVING INSULATION

BACKGROUND OF THE INVENTION

The subject matter disclosed herein relates to an apparatus for receiving insulation, and, more particularly, to a conduit for receiving an insulative layer.

Conduits, for example pipes and tubing for fluid and gas distribution, refrigeration lines and industrial applications, often carry liquids and gases over long distances that can effect the temperature of the transported material through radiational cooling or heat absorption. Accordingly, many of these conduits are covered with insulative outer layers that work to minimize heat transfer between the conduit, its contents and the environment in which it is located. Additionally, given modern trends towards improved energy efficiency, increased environmental awareness and the rising cost of electricity and fuel, many home and business owners and industrial system operators are looking for inexpensive ways of reducing their energy use. Insulating exposed pipes and conduits is one such way.

Some applications utilize pre-insulated conduits that are manufactured having an inner transport conduit through which material flows surrounded by a fixed, insulative outer layer, while others employ a pipe-in-pipe configuration in which a protective outer conduit surrounds an inner transport conduit with insulative material placed between them. These configurations can not only be expensive, but difficult to install as specialized or custom-made connections and conduit segments may be required to complete a given installation. Additionally, the various components comprising such a conduit network may only operate with and be interchangeable with other components of the same design.

Another less expensive solution is to manually surround the conduit with hollow tubes of insulative material, such as polystyrene foam, which can be pieced together over the length of the conduit. The insulation is either slid over the conduit during installation or wrapped around it following installation or when retrofitting an existing conduit network. However, the shape and construction of conventional conduit networks, which typically consist of round pipe or tubing, for example the hot water piping system in a residential home, does not easily facilitate such installation as contact between the inner surface of the hollow insulation tube and the outer surface of the conduit results in significant frictional resistance that impedes movement of the insulation. Additionally, the insulation has difficulty turning corners as the outer radius of the bend stretches the insulation, while the inner bend causes the insulation to bunch together. Finally, conventional conduit systems are comprised of numerous components that are likely not intended to have anything slid over them, and that typically contain various surface imperfections that can get caught on the inner surface of the insulation, for example material leftover from the brazing process, as well as blunt leading edge surfaces located at component junctures and connections.

Therefore, there is a need for a conduit design that facilitates the quick and inexpensive installation of insulation to reduce energy use.

The discussion above is merely provided for general background information and is not intended to be used as an aid in determining the scope of the claimed subject matter.

BRIEF DESCRIPTION of the INVENTION

A conduit for facilitating the installation of insulation is disclosed. In one embodiment, the conduit comprises a body having one or more ribs and a collar having a forward end taper.

In one exemplary embodiment, a conduit is disclosed. The conduit comprises a hollow body having an outer body wall and a central axis, a rib integral with the outer body wall, the rib disposed substantially parallel to the central axis and having an outer rib surface, and a collar fixed to an end of the body, the collar having an outer collar wall and a forward collar taper.

In another exemplary embodiment, a conduit network is disclosed. The conduit network comprises two or more pieces of conduit bonded together, at least one of the pieces of conduit comprising a hollow body having an outer body wall and a central axis, a rib integral with the outer body wall, the rib disposed substantially parallel to the central axis and having an outer rib surface, and a collar fixed to an end of the body, the collar having an outer collar wall and a forward collar taper.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

A conduit for facilitating the installation of insulation is disclosed. In one embodiment, the conduit comprises a body having one or more ribs and a collar having a forward end taper. Some of the advantages that may be realized in the practice of some disclosed embodiments of the conduit are improved ease with which insulation can be pushed or pulled along the conduit, or a network of conduits, and improved insulative properties for the conduit. These advantages can reduce installation and operational costs associated with use of the conduit.

Figure 1:
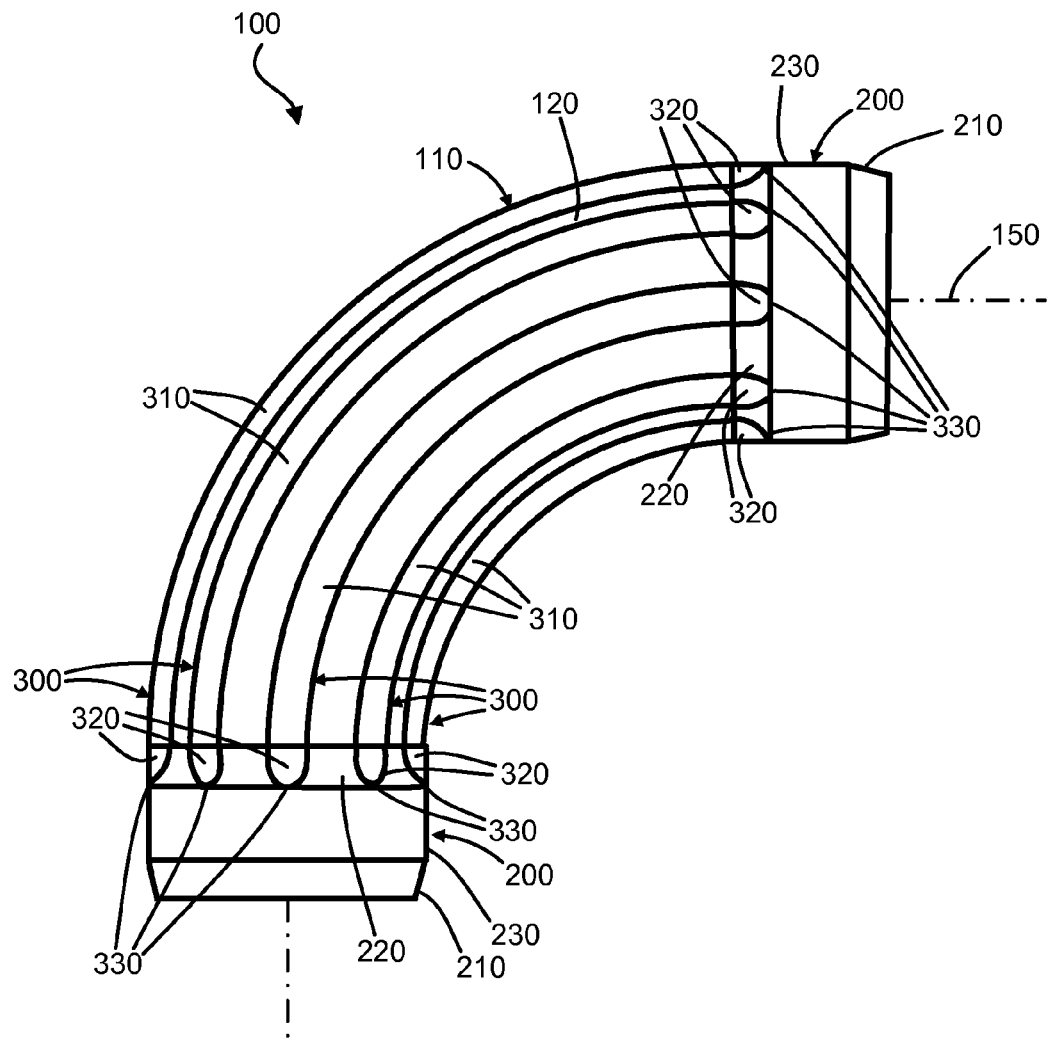
FIG. 1 is a perspective view of a section of conduit in one exemplary embodiment of the invention.
Figure 2:
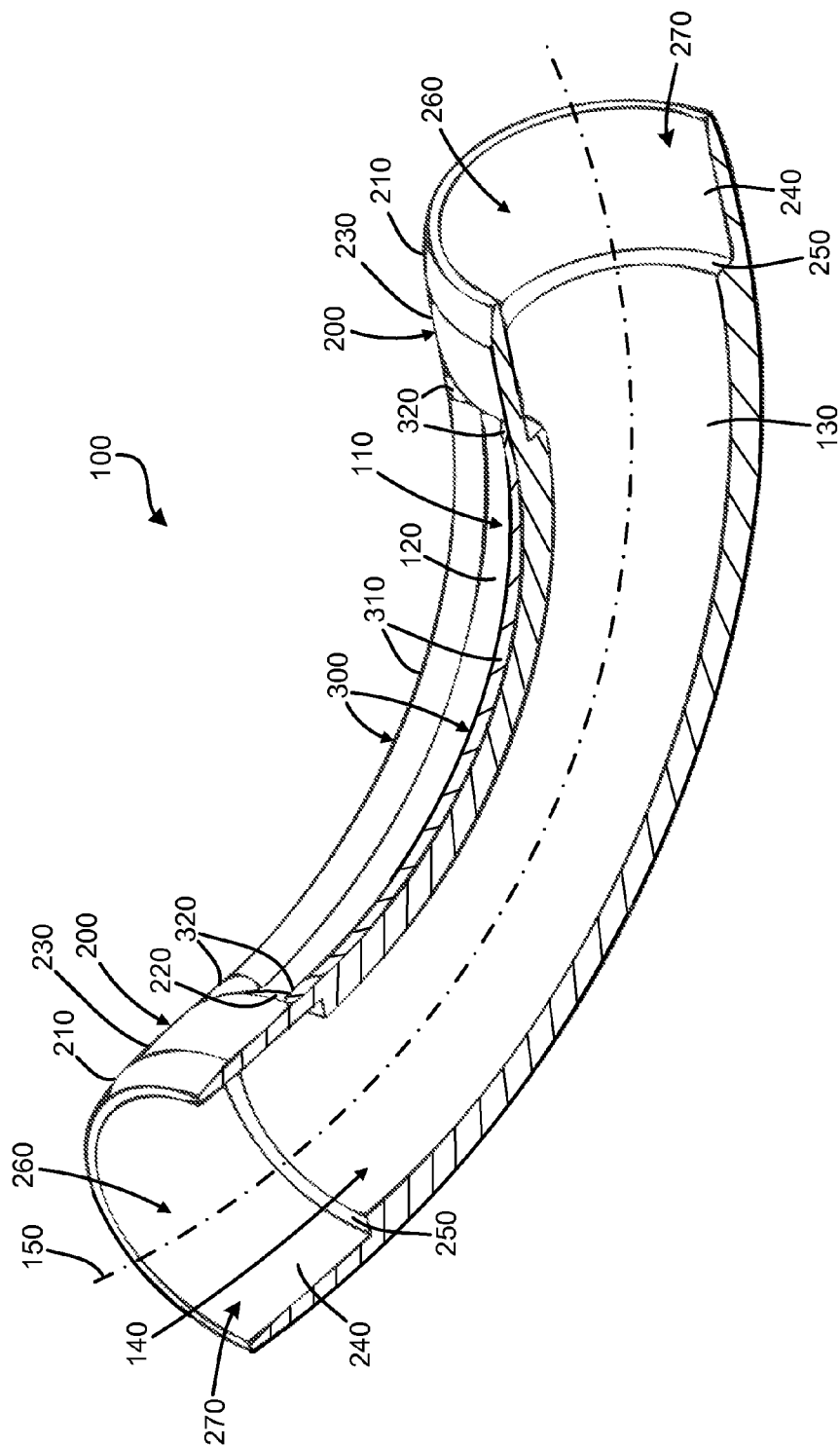
FIG. 2 is a cross-sectioned side view of a piece of conduit in one exemplary embodiment of the invention.

FIG. 1 shows a perspective view of a section of conduit 100 in one exemplary embodiment of the invention. FIG. 2 shows a cross sectional side view of a piece of conduit in one exemplary embodiment of the invention. With reference to FIGS. 1 and 2, conduit 100 can be a section of curved hollow tubing forming a body 110, with a collar 200 fixed on each end. Body 110 and collar 200 can be constructed out of a variety of materials, for example, polyvinylchloride (PVC), plastic, copper, brass, iron or steel. Collar 200 can be either integrally constructed as part of body 110, or fixed to it by any chemical or physical means, for example, PVC adhesives or brazing. Body 110 can have an outer body wall 120 and an inner body wall 130, with the inner body wall 130 forming an annular body passageway 140 extending through the body 110. Body 110 can be made to conform with any chosen shape or diameter to meet design requirements.

Collar 200 can be a section of hollow tubing having an outer collar wall 230 and an inner collar wall 240, with the inner collar wall 240 forming an annular collar passageway 270 extending through the collar 200. The ends of collar 200 can be tapered such that the outer ends of outer collar wall 230 can be directed inwardly towards the inner collar wall 240, with the result being the outer collar wall 230 is sloped on each end of the collar 200 to form a forward collar taper 210 on the end of the collar 200 opposite the body 110, and a rearward collar taper 220 on the end of the collar 200 adjacent the body 110. In other embodiments, collar 200 may only have a forward collar taper 210. In one embodiment, both ends of conduit 100 can have collars 200. In other embodiments, one or more ends of conduit 100 may not have a collar 200 in order to meet a particular design requirement.

As shown in FIG. 2, the diameter of the inner body passageway 140 can be smaller than that of the inner collar passageway 270, such that a shoulder 250 can be formed inside each end of conduit 100 where the body 110 is fixed to collar 200. Shoulder 250 can act as a stop when interconnecting conduit 100 with a second section of conduit, the second section of conduit fitting within a collar recess 260 formed by the inner collar wall 240 and shoulder 250. Shoulder 250 works to prevent the second section of conduit from extending too far into conduit 100.

A plurality of longitudinal ribs 300 can be located on the outer body wall 120. Each rib 300 can be comprised of a rib body 310 extending substantially parallel to the central axis 150 of the body 110 and following the contour of the body 110, along with an integrally fixed rib end 320 on each end of the rib body 310. Rib ends 320 can be in contact with the rearward collar tapers 220. The portion of each rib end 320 facing the collar 200 can have a rounded rib tip 330, and the portion of rib end 320 contacting the rearward collar taper 220 can be sloped to conform to the contour of the rearward collar taper 220. Rib tip 330 can end where the outer collar wall 230 begins to form the rearward collar taper 220.

Figure 3:
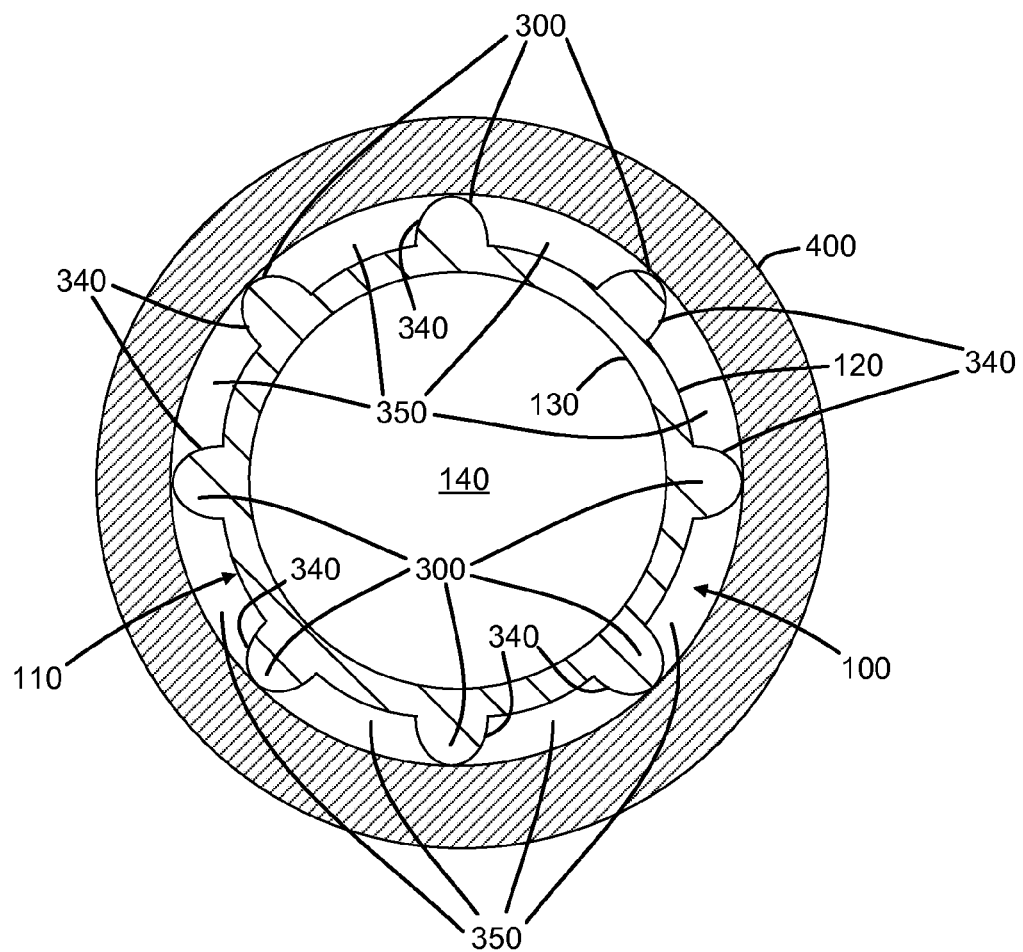
FIG. 3 is a cross-sectional view of the body of an insulated piece of conduit in one exemplary embodiment of the invention, in which the cross section is taken perpendicular to the central axis of the conduit.

FIG. 3 is a cross-sectional view of the body 110 of an insulated piece of conduit 100 in one exemplary embodiment of the invention, in which the cross section is taken perpendicular to the central axis 150 of the conduit 100. With reference to FIGS. 2 and 3, together, the surface of rib body 310 and rib ends 320 that are furthest from the central axis 150 can form an outer rib surface 340. Ribs 300 can have a cross section perpendicular to the central axis 150 that has a curvilinear outer rib surface 340, making ribs 300 rounded in nature.

Ribs 300 can extend from the outer body wall 120 such that the distance between the central axis 150 and the portion of the outer collar wall 230 furthest from the central axis 150 is the same as the distance between said central axis 150 and the outer rib surface 340. In one embodiment, the outer rib surface 340 can be the same distance from the central axis 150 along the entire rib 300, such that the portion of the outer collar wall 230 furthest from central axis 150 is flush with outer rib surface 340 along the entire body 110. In other embodiments, the outer rib surface 340 can be different distances from the central axis 150 at various points along rib 300. In one embodiment, ribs 300 can be uniformly spaced and can be of substantially similar design. In other embodiments, ribs 300 can be given individually chosen lengths, widths, shapes or spacing to satisfy particular design requirements and operational characteristics. The number of ribs 300 surrounding body 110 can be chosen to meet specific design requirements.

Insulation 400 can be a hollow tube comprised of insulative material, for example polystyrene foam. In operation, the forward collar taper 210 and ribs 300 can provide a continuous, smooth surface over which insulation 400 can be pushed or pulled. The ribs 300 provide less surface area in contact with the insulation 400 as compared to traditional conduit in which the entire circumference of the outer surface of the conduit is in contact with the insulation. The reduced surface areas of the conduit 100 and insulation 400 that are in contact with each other reduces the amount of friction between them, allowing more free movement of the two components with respect to one another. The rounded outer rib surfaces 340 of the ribs 300 also work to facilitate movement of the insulation 400 over conduit 100 and around bends in conduit 100. Additionally, because the forward collar taper 210 provides a graduated transition onto the body 110 and eliminates blunt edges or rough joints on which the insulation 400 could get caught, the ease with which insulation 400 can be moved over the surface of the conduit 100 is improved, reducing the time and cost to insulate a given conduit network. When insulation 400 is installed, ribs 300 also work to create a plurality of air gaps 350 that are bounded by the ribs 300, the outer body wall 120 and the inside surface of the insulation 400, further improving the insulative properties of the conduit 100 and insulation 400 combination, and thereby improving the energy efficiency of the arrangement.

Conduit 100 can be of any chosen shape, and can constitute standard conduit components, for example, straight sections, curved sections, elbows or corners, couplers, junctions, end caps, traps, and adaptors for transitioning between different conduit components and sizes. Conduit 100 can be made having any given diameter or wall thickness, and can be manufactured to any suitable length. Conduit 100 can be custom manufactured for specific applications, for example, to a specific length, shape, or diameter, or mass produced in standard shapes, lengths, diameters and component types.

Figure 4:
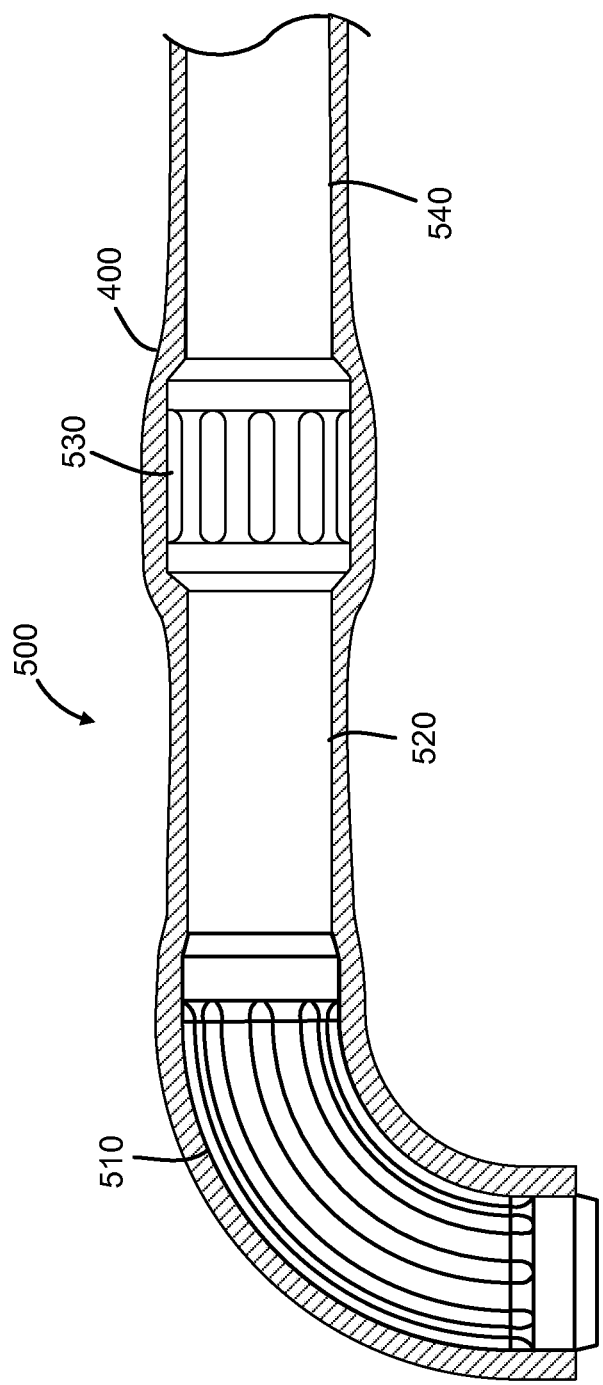
FIG. 4 is a perspective view of a conduit network in one exemplary embodiment of the invention.

FIG. 4 is a perspective view of a conduit network 500 in one exemplary embodiment of the invention. Conduit network 500 can comprise a plurality of different conduit sections that are joined together through physical or chemical means to meet a particular design specification. For example, the illustrative conduit network 500 shown in FIG. 4 comprises an elbow section 510 having one end coupled to a first straight section 520, with the opposing end of first straight section 520 being joined to a second straight section 540 by a coupler 530. In this embodiment, the various components work together such that the combined outer surface of the conduit network 500 is continuous with graduated transitions between components that allow insulation 400 to be pushed or pulled over each of the components. In one embodiment, conduit 100 can be incorporated into a traditional conduit network comprising, for example, round pipe. In other embodiments, the conduit network 500 can be comprised of various components exhibiting one or more design features of conduit 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A conduit comprising:
   a hollow body having an outer body wall and a central axis;
   a rib integral with said outer body wall, said rib disposed substantially parallel to said central axis and having an outer rib surface; and
   a collar fixed to an end of said body, said collar having an outer collar wall and a forward collar taper,
   wherein the distance between said central axis and the portion of said outer collar wall furthest from said central axis is the same as the distance between said central axis and said outer rib surface.

2. The conduit of claim 1, wherein a cross section of said outer rib surface perpendicular to the central axis is curvilinear.

3. The conduit of claim 1, wherein the distance between said central axis and said outer rib surface is the same along said entire rib.

4. The conduit of claim 1, wherein said collar further comprises a rearward collar taper.

5. The conduit of claim 1, wherein said conduit further comprises a collar recess.

6. The conduit of claim 1, wherein said collar is integrally fixed to said body.

7. The conduit of claim 1, wherein more than one end of said conduit has a collar.

8. The conduit of claim 1, wherein said conduit is an elbow.

9. The conduit of claim 1, wherein said conduit is a coupler.

10. The conduit of claim 1, wherein said conduit is an adaptor.

11. The conduit of claim 1, wherein said conduit is a straight section.

12. A conduit network comprising:
    two or more pieces of conduit joined together, at least one of said pieces of conduit comprising:
    a hollow body having an outer body wall and a central axis;
    a rib integral with said outer body wall, said rib disposed substantially parallel to said central axis and having an outer rib surface; and
    a collar fixed to an end of said body, said collar having an outer collar wall and a forward collar taper,
    wherein the distance between said central axis and the portion of said outer collar wall furthest from said central axis is the same as the distance between said central axis and said outer rib surface.

13. The conduit of claim 12, wherein a cross section of said outer rib surface perpendicular to the central axis is curvilinear.

14. The conduit of claim 12, wherein the distance between said central axis and said outer rib surface is the same along said entire rib.

15. The conduit of claim 12, wherein said collar further comprises a rearward collar taper.

16. The conduit of claim 12, wherein said at least one of said pieces of conduit further comprises a collar recess.

17. The conduit of claim 12, wherein said collar is integrally fixed to said body.

18. The conduit of claim 12, wherein more than one end of said at least one of said pieces of conduit has a collar.

\* \* \* \* \*